US009024210B2

(12) United States Patent
Crisfield et al.

(10) Patent No.: US 9,024,210 B2
(45) Date of Patent: May 5, 2015

(54) FEEDTHRU INCLUDING A CERAMIC BASED COATING AND A METHOD OF APPLYING A CERAMIC BASED COATING TO A FEEDTHRU

(75) Inventors: Matthew T. Crisfield, Boulder, CO (US); Michele Moore, Lafayette, CO (US); Robert B. Garnett, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 613 days.

(21) Appl. No.: 12/934,352

(22) PCT Filed: Mar. 25, 2009

(86) PCT No.: PCT/US2009/038205

§ 371 (c)(1), (2), (4) Date: Sep. 24, 2010

(87) PCT Pub. No.: WO2009/137178

PCT Pub. Date: Nov. 12, 2009

(65) Prior Publication Data

US 2011/0056745 A1 Mar. 10, 2011

Related U.S. Application Data

(60) Provisional application No. 61/042,462, filed on Apr. 4, 2008.

(51) Int. Cl.

*H02G 3/18* (2006.01)
*H01R 13/533* (2006.01)
*H01R 13/74* (2006.01)
*H01R 4/02* (2006.01)

(52) U.S. Cl.

CPC ......... *H01R 13/533* (2013.01); *Y10T 29/49174* (2015.01); *H01R 4/023* (2013.01); *H01R 13/74* (2013.01)

(58) Field of Classification Search

CPC ...... H01R 13/533; H01R 13/74; H01R 4/023; Y10T 29/49174
USPC ........................................................ 174/650
See application file for complete search history.

(56) References Cited

U.S. PATENT DOCUMENTS 4,476,155 A * 10/1984 Niemi .............................. 427/58
4,876,898 A * 10/1989 Cage et al. ............... 73/861.355

(Continued)

FOREIGN PATENT DOCUMENTS

JP 56107478 A 1/1983
JP 61102847 1/1988

(Continued)

OTHER PUBLICATIONS

Aremco Products et al: "High Temperature Protective Coatings" Internet Citation [Online], Mar. 2, 2006, XP007910793 Retrieved from the Internet: URL:http://web.archive.org/web/20060302022510/aremco.com/PDFs/A6_06.pdf>p. 2.

*Primary Examiner* — Timothy Thompson
*Assistant Examiner* — Rhadames J Alonzo Miller
(74) *Attorney, Agent, or Firm* — The Ollila Law Group LLC

(57) ABSTRACT

The present invention relates to a feedthru (210, 210') provided with a ceramic based coating (260) and a method of providing a feedthru (210, 210') with a ceramic based coating (260). The feedthru (210, 210') includes at least one conductive pin (220) that extends through a header (217) and includes an exposed first end (221) and an exposed second end (222) spaced by an insulated portion (224). The at least one conductive pin (220) connects a first conductive element (121) connected with a first electrical device (300, 300*a*, 300*b*, 104, 105, 105') and a second conductive element (121') connected with another electrical device (20, 301), whereby the exposed first end (221) connects to the first conductive element (121) and the exposed second end (221) connects to the second conductive element (121'). The ceramic based coating (260) located on at least one of the following at least a portion of the first end (221) of the at least one conductive pin (220) that abuts the insulated portion (224) of the at least one conductive pin (220), at least a portion of the second end (222) of the at least one conductive pin (220) that abuts the insulated portion (224) of the pin (220), at least a portion of a first side (217*a*) of the header (217) that abuts the insulated portion (224) of the pin (220), and at least a portion of a second side (217*b*) of the header (217) that abuts the insulated portion (224) of the pin (220).

19 Claims, 10 Drawing Sheets

(56) References Cited

U.S. PATENT DOCUMENTS

| | | | | |
|---|---|---|---|---|
| 6,286,373 | B1 * | 9/2001 | Lister et al. | 73/861.355 |
| 2008/0294220 | A1 * | 11/2008 | Stevenson et al. | 607/36 |

FOREIGN PATENT DOCUMENTS

| | | | |
|---|---|---|---|
| WO | 0047957 | A | 8/2000 |
| WO | 2007005981 | A | 1/2007 |

* cited by examiner

FEEDTHRU INCLUDING A CERAMIC BASED COATING AND A METHOD OF APPLYING A CERAMIC BASED COATING TO A FEEDTHRU

FIELD OF THE INVENTION

The present invention relates to a feedthru including a ceramic based coating and a method of applying a ceramic based coating to a feedthru.

BACKGROUND OF THE INVENTION

Feedthrus are used to connect conductive elements of two or more electrical devices. By way of example, where a first electrical device is located in a particular environment, such as, for example, a vacuum environment, a high or low temperature environment, or a particular gas environment, including, an explosive gas environment or a low or high moisture environment, and one or more other electrical device are located outside the particular environment of the first electrical environment. In such an example, one or more feedthrus may be provided that connect the two or more electrical devices in a manner that permits isolation of the particular environment of the first electrical device.

To permit connection of the one or more electrical devices, the feedthru is provided with at least one conductive pin that extends through a header, which functions as a barrier between two sides of the conductive pin. Where the header is a conductive material, an insulating material may be located around the portion of the conductive pin that extends through the header in order to prevent an electrical current passing to the header or between the pins. Where the header is a non-conductive material, the header itself may function as an insulating material that prevents an electrical current from passing between the pins. In this manner, the first side of the conductive pin may connect to a conductive element, such as, for example, a wire or terminal, connected with a first electrical device and the second side connects to a conductive element connected with a second electrical device to provide an electrically conducting pathway between the first and second electrical devices.

Since at least a portion of the first and second sides of the conductive pin must be exposed in order to connect the conductive pins to the conductive elements, where the header is a conductive material, where the feedthru includes more than one pin, or where the feedthru contacts some other conductive material, creepage breakdown can cause short circuiting. At high temperatures, creepage breakdown is even more problematic, since moisture tends to condense more readily at elevated temperatures. For example, where the feedthru includes a plurality of pins, a layer of moisture may condense on any insulating material and provide a conductive pathway between the pins. By way of yet another example, where the header is a conductive material, a layer of moisture may condense the insulation material and provide a conductive pathway between one or more pins and the header.

It has been observed that contamination on the surface of any insulating material located around the conductive pins of the feedthru may exacerbate this problem. By way of example, such contamination may provide a point for the moisture to condense. By way of yet another example, such contamination may dissolve into any condensate to form an electrolyte that itself generates voltages over 100 mV.

One approach to solving this problem involves providing a coating of an insulating material on the exposed portions of the pins and/or in situations where the header is a conductive material, on the header. In this manner, the creepage distance can be increased. Furthermore, an insulating material can be used to coat any exposed conductive material, i.e. the exposed portions of the pins, the exposed portions of the conductive elements, and, if used, any brazed or soldered material used to connect the pins to the conductive elements. Assuming the insulating material is impermeable to moisture, in this manner creepage can be eliminated if all exposed conductive materials are coated. One type of insulating material used for this purpose is Lektro-Tech, an electrical and mechanical corrosion preventive compound including 3,3-dichloro-1,1,12,2-pentafluoropropane, 1,3-dichloro-1,1,2,3-pentafluorpropanecyclohexane, oxygenated hydrocarbon, and carbon dioxide propellant. This compound is effective at forming a barrier over exposed conductive material to increase creepage distances or to significantly eliminate creepage breakdown.

Although Lektro-Tech is effective at preventing short circuits in temperatures ranging from about 150° C. to about 205° C., use of Lektro-Tech has been ineffective at preventing short circuits where the temperature of the operating environment exceeds about 205° C. However, as previously mentioned, unless adequate ventilation is provided condensation is more likely to occur as the temperature increases.

The present invention relates to a feedthru including a ceramic based coating and a method of applying a ceramic based coating to a feedthru.

SUMMARY OF THE INVENTION

The scope of the present invention is defined solely by the appended claims, and is not affected to any degree by the statements within this summary.

According to one embodiment of the present invention, at least one feedthru comprises at least one conductive pin that extends through a header and a ceramic based coating. The at least one conductive pin includes an exposed first end and an exposed second end spaced by an insulated portion. The at least one conductive pin connects a first conductive element connected with a first electrical device and a second conductive element connected with another electrical device, whereby the exposed first end connects to the first conductive element and the exposed second end connects to the second conductive element. The ceramic based coating is located on at least one of the following at least a portion of the first end of the at least one conductive pin that abuts the insulated portion of the at least one conductive pin, at least a portion of the second end of the at least one conductive pin that abuts the insulated portion of the pin, at least a portion of a first side of the header that abuts the insulated portion of the pin, and at least a portion of a second side of the header that abuts the insulated portion of the pin.

According to another embodiment of the present invention, a method for connecting a first electrical device to another electrical device comprises the steps of: providing a feedthru that includes at least one conductive pin that extends through a header, wherein the at least one conductive pin includes an exposed first end and an exposed second end spaced by an insulated portion, connecting the exposed first end to a first conductive element connected with the first electrical device, connecting the exposed second end to a second conductive element connected with the another electrical device, applying a ceramic based coating so that it is located on at least one of the following at least a portion of the first end of the at least one conductive pin that abuts the insulated portion of the at least one conductive pin, at least a portion of the second end of the at least one conductive pin that abuts the insulated portion of the pin, at least a portion of a first side of the header that abuts the insulated portion of the pin, and at least a portion of a second side of the header that abuts the insulated portion of the pin.

Aspects

According to one aspect of the present invention at least one feedthru comprises:

at least one conductive pin that extends through a header wherein:
- the at least one conductive pin includes an exposed first end and an exposed second end spaced by an insulated portion;
- the at least one conductive pin connects a first conductive element connected with a first electrical device and a second conductive element connected with another electrical device, whereby the exposed first end connects to the first conductive element and the exposed second end connects to the second conductive element;
- a ceramic based coating located on at least one of the following:
  - at least a portion of the first end of the at least one conductive pin that abuts the insulated portion of the at least one conductive pin;
  - at least a portion of the second end of the at least one conductive pin that abuts the insulated portion of the pin;
  - at least a portion of a first side of the header that abuts the insulated portion of the pin; and
  - at least a portion of a second side of the header that abuts the insulated portion of the pin.

Preferably, the ceramic based coating is located on at least the portion of the second end of the at least one conductive pin that abuts the insulated portion of the pin and on at least the portion of the second side of the header that abuts the insulated portion of the pin, wherein the second end of the at least one conductive pin extends from the second side of the header.

Preferably, the ceramic based coating is located on at least the portion of the first end of the at least one conductive pin that abuts the insulated portion of the pin and on at least the portion of a first side of the header that abuts the insulated portion of the pin, wherein the first end of the at least one conductive pin extends from the first side of the header.

Preferably, the ceramic based coating is located on at least the portion of the first end of the at least one conductive pin that abuts the insulated portion of the pin, at least the portion of a first side of the header that abuts the insulated portion of the pin, at least the portion of the second end of the at least one conductive pin that abuts the insulated portion of the pin, and at least the portion of the second side of the header that abuts the insulated portion of the pin, wherein the first end of the at least one conductive pin extends from the first side of the header and the second end of the at least one conductive pin extends from the second side of the header.

Preferably, the exposed first end of the at least one conductive pin is connected with the first conductive element via a first connection joint and the exposed second end of the at least one conductive pin is connected with the second conductive element via a second connection joint and the ceramic based coating is located on at least one of the first and second connection joints.

Preferably, the first conductive element includes a first exposed portion and a first insulated portion and the second conductive element includes a second exposed portion and a second insulated portion and the ceramic based coating is located on at least one of the first and second exposed portions.

Preferably, the first conductive element includes a first exposed portion and a first insulated portion, the second conductive element includes a second exposed portion and a second insulated portion, the exposed first end of the at least one conductive pin is connected with the first exposed portion of the first conductive element via a first connection joint, the exposed second end of the at least one conductive pin is connected with the second exposed portion of the second conductive element via a second connection joint, and the ceramic based coating extends from at least one or both of the following the first end of the at least one conductive pin that abuts the insulated portion of the pin to the first insulating portion of the first conductive element and the second end of the at least one conductive pin that abuts the insulated portion of the pin to the second insulating portion of the second conductive element.

Preferably, the feedthru includes a plurality of pins that extend through the header and connect the first electrical device with the another electrical device and the ceramic based coating is located on at least one of the following at least the portion of the first end of each conductive pin that abuts the insulated portion of each of the conductive pin, at least the portion of the second end of each conductive pin that abuts the insulated portion of each conductive pin, at least the portion of a first side of the header that abuts the insulated portion of each conductive pin, and at least the portion of a second side of the header that abuts the insulated portion of each conductive pin.

Preferably, the feedthru includes a plurality of pins that extend through the header and connect a first electrical device and a second electrical device with the another electrical device and the ceramic based coating is located on at least one of the following at least the portion of the first end of each conductive pin that abuts the insulated portion of each of the conductive pin, at least the portion of the second end of each conductive pin that abuts the insulated portion of each conductive pin, at least the portion of a first side of the header that abuts the insulated portion of each conductive pin, and at least the portion of a second side of the header that abuts the insulated portion of each conductive pin.

Preferably, the first electrical device includes a drive of a vibrating flow device and the another electrical device includes one or more electronics of the vibrating flow device.

Preferably, the first electrical device includes a pick-off of a vibrating flow device and the another electrical device includes one or more electronics of the vibrating flow device.

According to another aspect of the present invention, a method for connecting a first electrical device to another electrical device comprises the steps of:

providing a feedthru that includes at least one conductive pin that extends through a header, wherein the at least one conductive pin includes an exposed first end and an exposed second end spaced by an insulated portion;

connecting the exposed first end to a first conductive element, connected with the first electrical device;

connecting the exposed second end to a second conductive element connected with the another electrical device;

applying a ceramic based coating so that it is located on at least one of the following:
- at least a portion of the first end of the at least one conductive pin that abuts the insulated portion of the at least one conductive pin;
- at least a portion of the second end of the at least one conductive pin that abuts the insulated portion of the pin;

at least a portion of a first side of the header that abuts the insulated portion of the pin; and at least a portion of a second side of the header that abuts the insulated portion of the pin.

Preferably, the ceramic based coating is applied on at least the portion of the second end of the at least one conductive pin that abuts the insulated portion of the pin and on at least the portion of the second side of the header that abuts the insulated portion of the pin, wherein the second end of the at least one conductive pin extends from the second side of the header.

Preferably, the ceramic based coating is applied on at least the portion of the first end of the at least one conductive pin that abuts the insulated portion of the pin and on at least the portion of a first side of the header that abuts the insulated portion of the pin, wherein the first end of the at least one conductive pin extends from the first side of the header.

Preferably, the ceramic based coating is applied on at least the portion of the first end of the at least one conductive pin that abuts the insulated portion of the pin, at least the portion of a first side of the header that abuts the insulated portion of the pin, at least the portion of the second end of the at least one conductive pin that abuts the insulated portion of the pin, and at least the portion of the second side of the header that abuts the insulated portion of the pin, wherein the first end of the at least one conductive pin extends from the first side of the header and the second end of the at least one conductive pin extends from the second side of the header.

Preferably, the method further comprises the steps of soldering or brazing the exposed first end to the first conductive element to provide a first connection joint, soldering or brazing the exposed second end to the second conductive element to provide a second connection joint, and applying the ceramic based coating on to at least one of the first and second connection joints.

Preferably, the first conductive element includes a first exposed portion and a first insulated portion and the second conductive element includes a second exposed portion and a second insulated portion and further comprising the step of applying the ceramic based coating onto at least one of the first and second exposed portions.

Preferably, the first conductive element includes a first exposed portion and a first insulated portion, the second conductive element includes a second exposed portion and a second insulated portion, the exposed first end of the at least one conductive pin is connected with the first exposed portion of the first conductive element via a first connection joint, the exposed second end of the at least one conductive pin is connected with the second exposed portion of the second conductive element via a second connection joint, and the method further comprises the step of applying the ceramic based coating so that it extends from at least one or both of the following the first end of the at least one conductive pin that abuts the insulated portion of the pin to the first insulating portion of the first conductive element and the second end of the at least one conductive pin that abuts the insulated portion of the pin to the second insulating portion of the second conductive element.

Preferably, the feedthru includes a plurality of pins that extend through the header and connect the first electrical device with the another electrical device and the method further comprises the step of applying the ceramic based coating so that it is located on at least one of the following at least the portion of the first end of each conductive pin that abuts the insulated portion of each of the conductive pin, at least the portion of the second end of each conductive pin that abuts the insulated portion of each conductive pin, at least the portion of a first side of the header that abuts the insulated portion of each conductive pin, and at least the portion of a second side of the header that abuts the insulated portion of each conductive pin.

Preferably, the feedthru includes a plurality of pins that extend through the header and connect a first electrical device and a second electrical device with the another electrical device and the method further comprises the step of applying the ceramic based coating so that it is located on at least one of the following at least the portion of the first end of each conductive pin that abuts the insulated portion of each of the conductive pin, at least the portion of the second end of each conductive pin that abuts the insulated portion of each conductive pin, at least the portion of a first side of the header that abuts the insulated portion of each conductive pin, and at least the portion of a second side of the header that abuts the insulated portion of each conductive pin.

Preferably, the first electrical device includes a drive of a vibrating flow device and the another electrical device includes one or more electronics of the vibrating flow device.

Preferably, the first electrical device includes a pick-off of a vibrating flow device and the another electrical device includes one or more electronics of the vibrating flow device.

DETAILED DESCRIPTION OF THE PRESENTLY PREFERRED EMBODIMENT

Figure 1A:
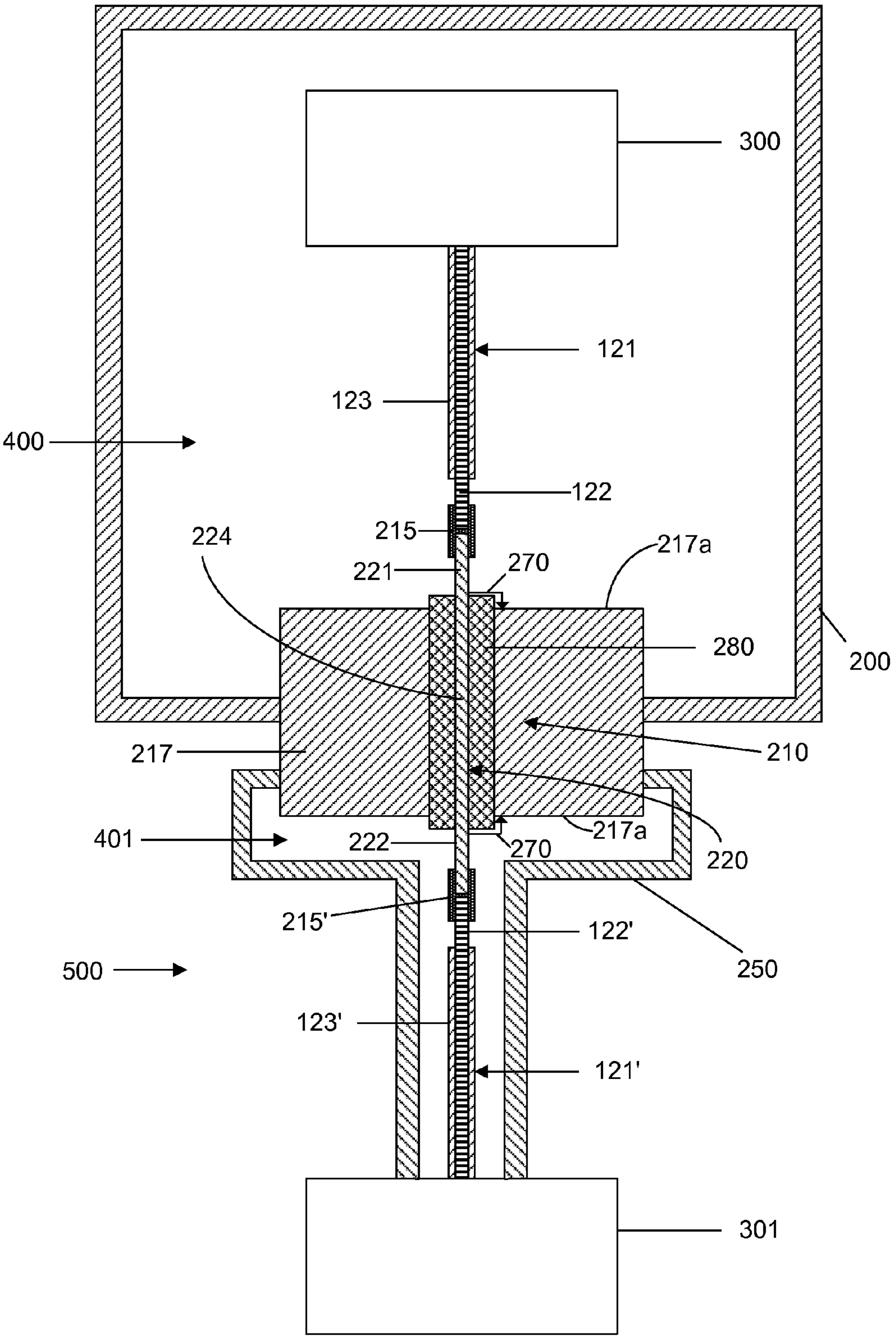
FIG. 1A depicts a sectional view of a feedthru connecting a plurality of electrical devices.
Figure 1B:
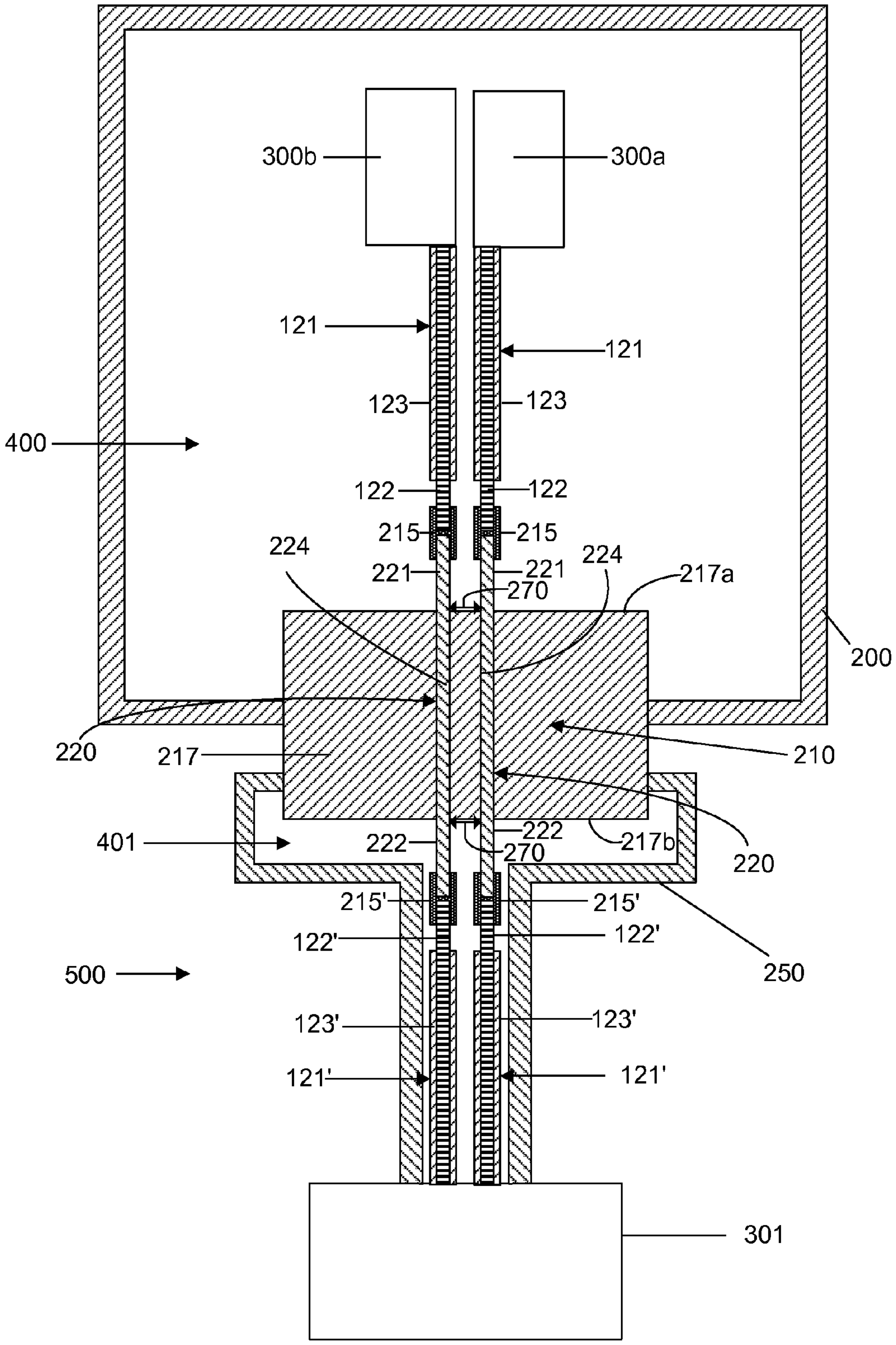
FIG. 1B depicts a sectional view of a feedthru connecting a plurality of electrical devices.
Figure 1C:
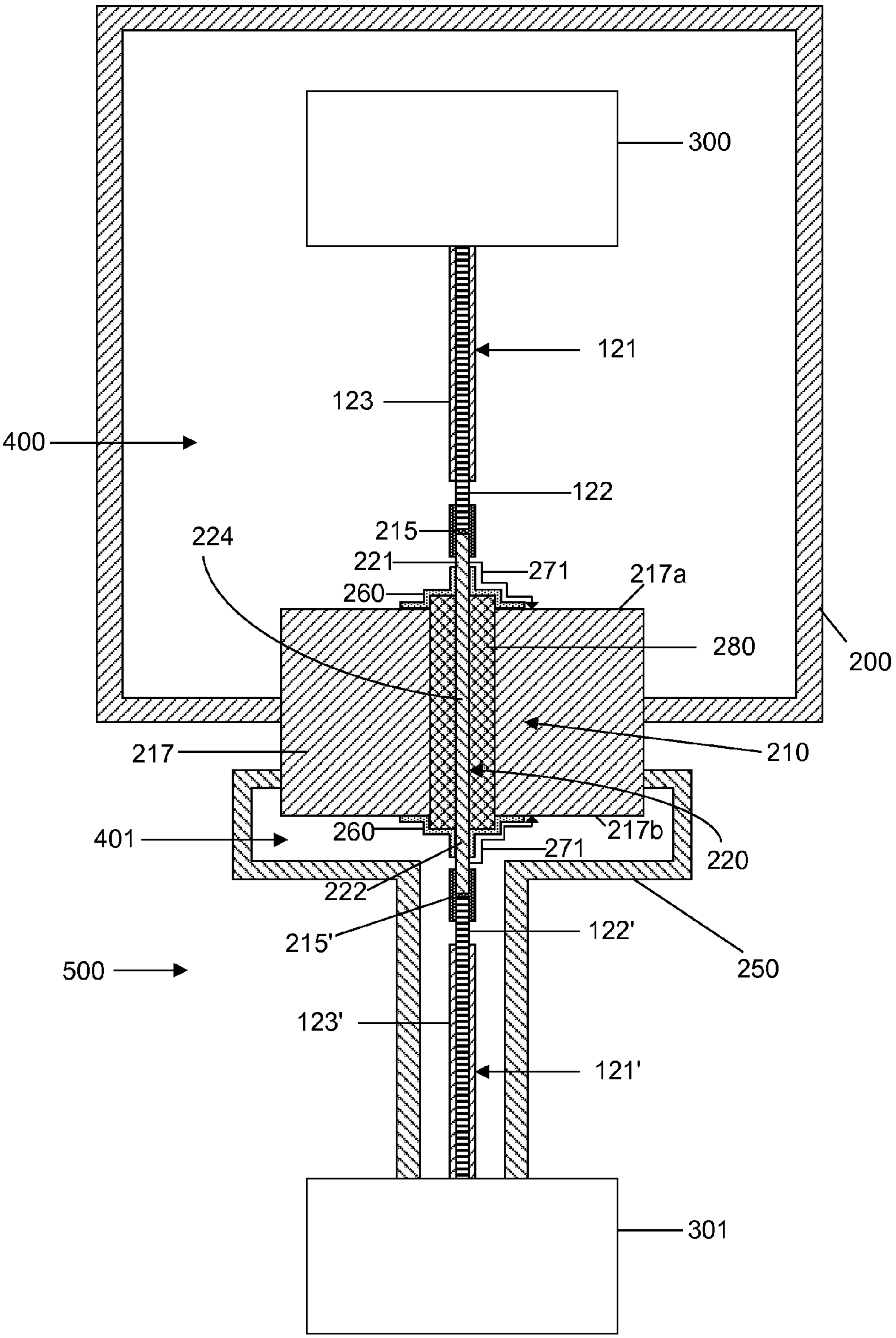
FIG. 1C depicts a sectional view of a feedthru connecting a plurality of electrical devices.
Figure 1D:
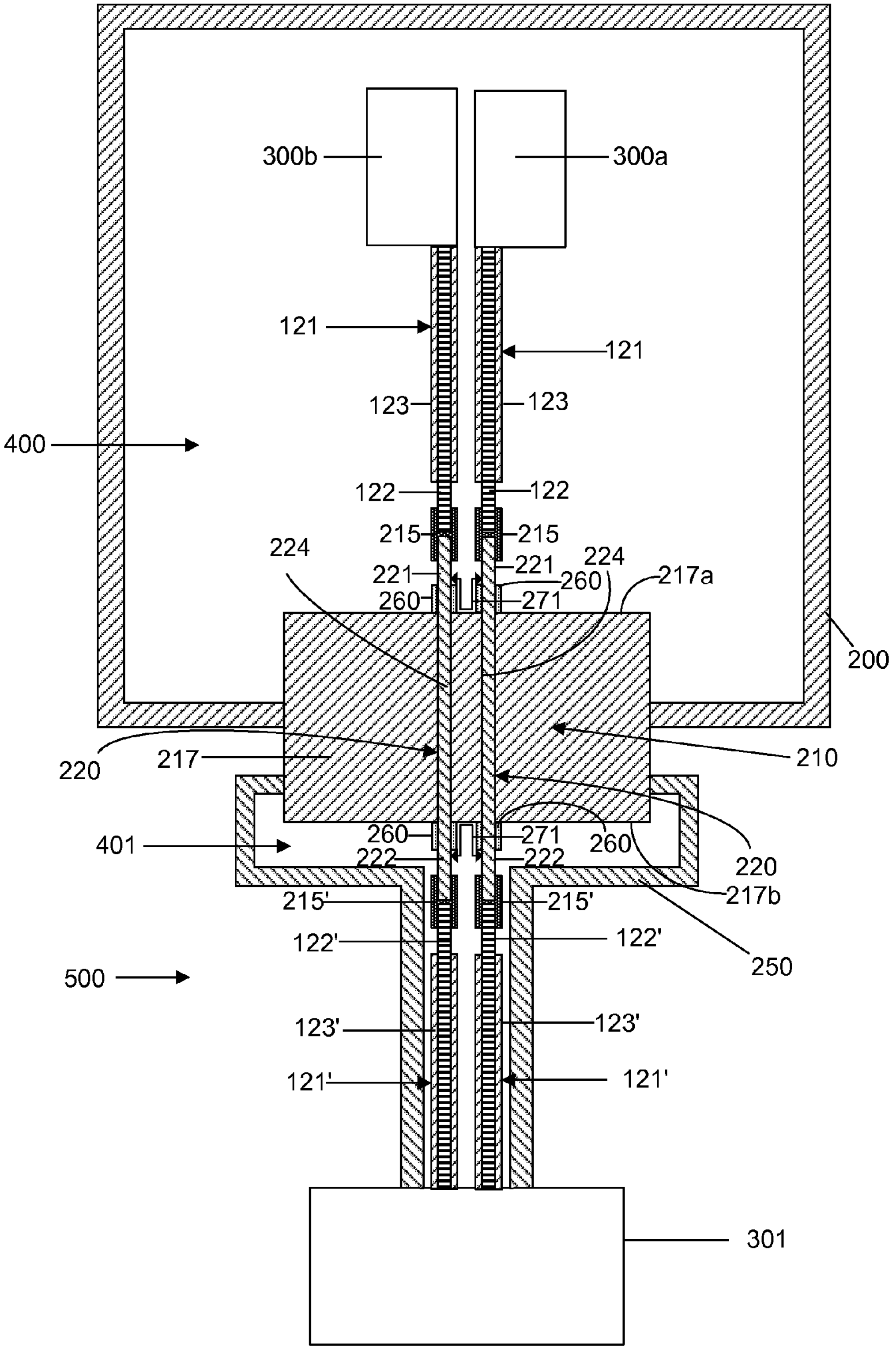
FIG. 1D depicts a sectional view of a feedthru connecting a plurality of electrical devices.

FIGS. 1A-1E show a feedthru 210 used to connect two or more electrical devices 300 and 301 or 300*a*, 300*b* and 301. As shown, the feed thru 210 includes at least one pin 220 that extends through a header 217. The header 217 may be fabricated from a conductive material, such as, for example, a metal. In such situations, the pins 220 may be electrically isolated from the header 217 and/or other conductive pins 220 by an insulating material 280, such as, for example, and not limitation, a ceramic, glass, rubber, or plastic. In certain embodiments, as shown in FIGS. 1B and 1D, the header 217 may be fabricated from a material having a high electrical resistance, such as, for example, and not limitation, a ceramic, glass, rubber, or plastic, which itself functions as an insulating material.

Figure 1E:
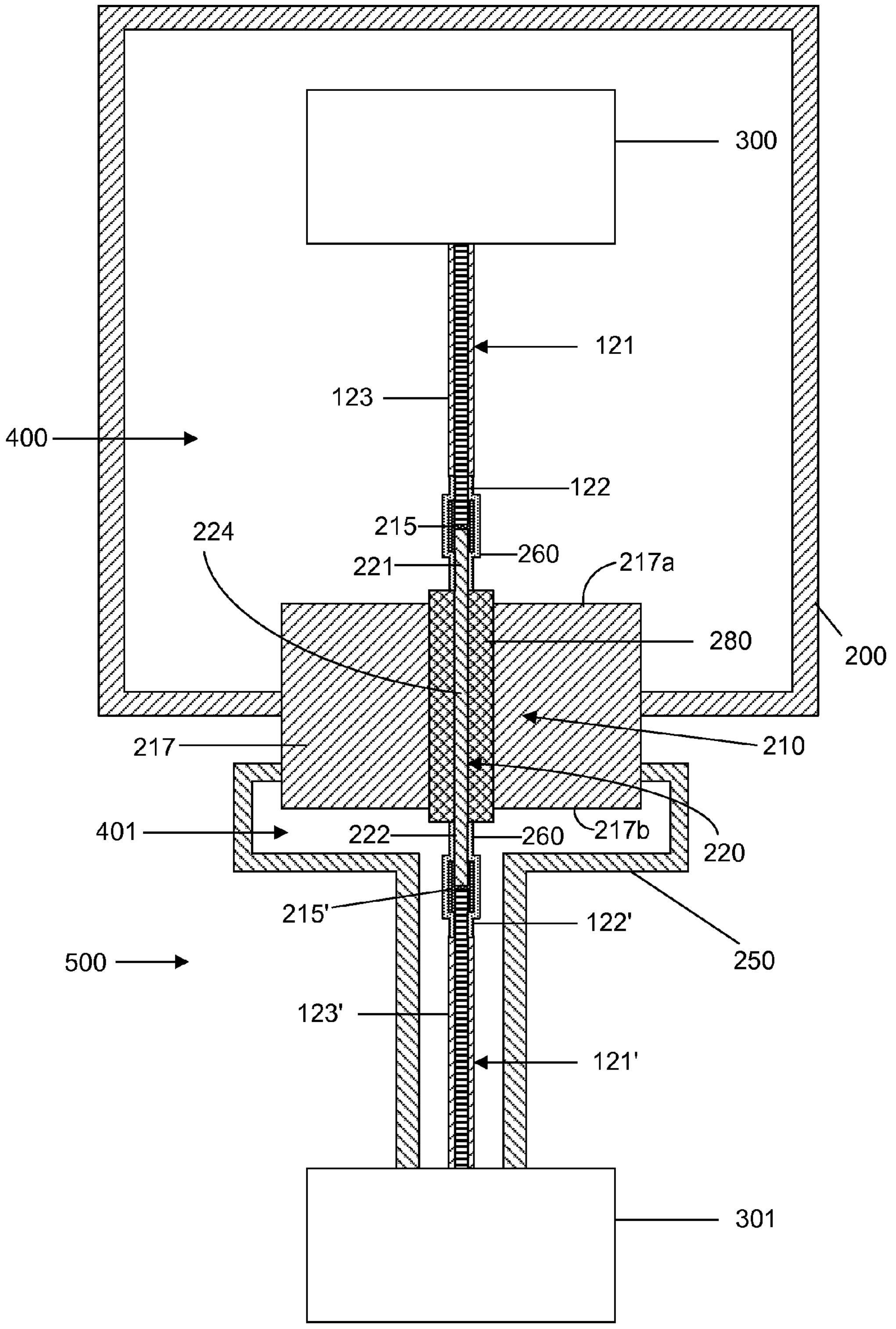
FIG. 1E depicts a sectional view of a feedthru connecting a plurality of electrical devices.
Figure 2:
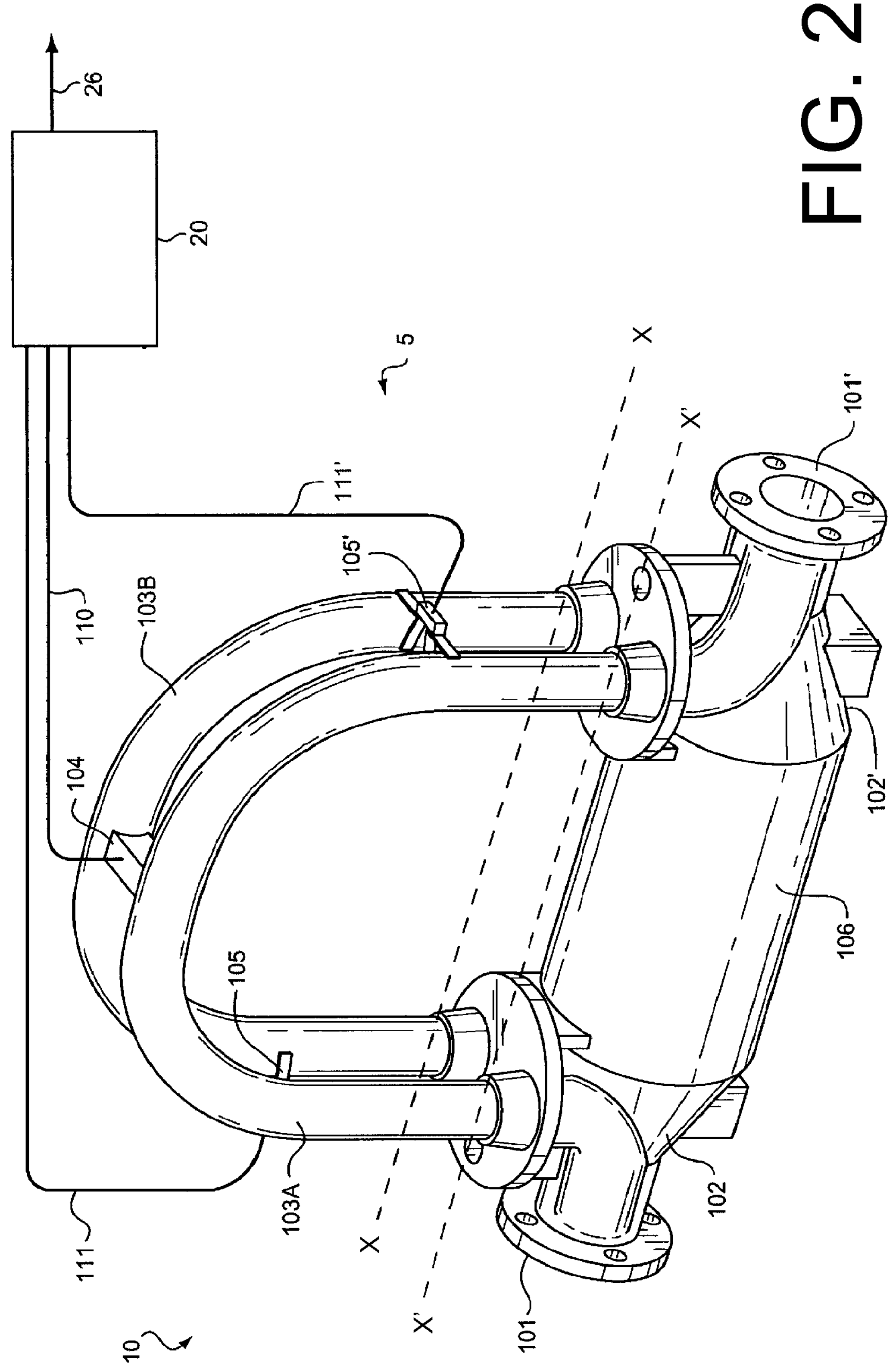
FIG. 2 depicts a perspective view of a vibrating flow device according to one embodiment of the present invention.

In the embodiment depicted in FIGS. 1A, 1C, and 1E, the pin 220 connects a first conductive element 121 with a second conductive element 121' of the respective electrical devices 300, 301. In the embodiments depicted in FIGS. 1B and 1D, a plurality of pins 220 connect electrical devices 300*a*, 300*b* to the electrical device 301. Those of ordinary skill in the art will appreciate in a similar manner a plurality of pins 220 may connect the electrical devices 300, 301 with each other. For example, rather than the plurality of pins 220 connecting electrical devices 300*a*, 300*b* to electrical device 301, the plurality of pins 220 may provide a plurality of connections between the electrical device 300, 301.

As shown in the embodiments depicted in FIGS. 1A-1E, each pin 220 includes a first side 221 and a second side 222 spaced by an insulated portion 224. The first side 221 connects to an exposed portion 122 of a first conductive element 121 and the second side 222 connects to an exposed portion 122' of a second conductive element 121'. Those of ordinary skill in the art will appreciate that the connection may, if desired, be provided mechanically, via welding, via soldering, or via brazing, as at 215, 215', between the first and second sides 221, 222 and the respective exposed portions 122, 122'. Also shown in FIG. 1, the conductive elements 121, 121' preferably include insulated portions 123, 123', which terminate at the exposed portions 122, 122'.

As shown at least one of the first or second sides 221, 222 may be located in an environment that is not adequately vented. For example, and not limitation, the sides 221 may be located in a housing 200 for electrical device 300 or electrical devices 300*a*, 300*b* that, at least partially, isolates the environment 400 of the first sides 221 of the pins 220 from an environment 500 outside the housing 200. Additionally, or alternatively, the feedthru 210 may be connected with a conduit 250 for the conductive element 121' that, at least partially, isolates the environment 401 of the second sides 222 of the pins 222 from an environment 500 outside the conduit 250.

Since the environment 400 and/or the environment 401 are at least partially isolated, they may not be adequately vented and any material, such as, for example, moisture, within environments 400, 401 may form condensate. Condensate is particularly problematic if the temperature of the environments 400, 401 is elevated. When condensate occurs on insulating material, for example, insulating material 280 in FIGS. 1A, 1C, 1E or the header 217 in FIGS. 1B, 1D, the condensate may provide a low resistance pathway 270, as shown in FIGS. 1A and 1B. This low resistance pathway 270 may cause electrical energy to pass from the first or second ends 221, 222 of the pin 220 to the header 217 in a manner that generates a short in the connection between the first and second electrical devices 300, 301. Since many feedthrus include two or more pins 220, even in situations where the header 217 is fabricated from a material having a high electrical resistance, a low resistance pathway 270 could similarly be generated between two or more pins 220, as shown in FIG. 1B. Furthermore, in a similar manner, a low resistance pathway could also be generated between one or more pins 220 and any other conductive material, for example, and not limitation, between at least one pin 220 and the housing 200 and/or the conduit 250.

According to one aspect of the present embodiment, a high electrical resistant ceramic based coating 260, such as, for example, and not limitation, a coating of CP 4050 Corr-Paint, a compound including xylene, silicone emulsion, fatty alcohol, polyglycol ether, and green dye, Ceramabond 512, a compound including silicate solution and aluminum oxide, Ceramabond 552, a compound including silicate solution and aluminum oxide, Ceramabond 569, a compound including silicate solution and aluminum oxide suspended in an inorganic liquid solution, Ceramabond 671, a compound including silicate solution and aluminum oxide suspended in an inorganic liquid solution, or Ceramabond 835-M, a compound including silicate solution and aluminum oxide, is applied to provide an elongated creepage pathway 271. According to another aspect of the present embodiment, a ceramic based coating 260 may be used to eliminate creepage breakdown.

Although each of the above-referenced products is offered by Aremco Products, Inc. of Valley Cottage, N.Y., these products are merely examples of suitable ceramic based coatings 260 and it is within the scope of the present invention to utilize other ceramic based coatings 260. Advantageously, the ceramic based coating 260 is preferably selected so that it is stable and maintains its high electrical resistance insulating properties at temperatures that exceed 205° C., for example, and not limitation, up to 1100° C.

As shown in FIGS. 1C, 1D, at least a portion of the exposed ends 221, 222 of the conductive pins 220 and/or the header 217 may be provided with a temperature stable ceramic based coating 260, which provides an elongated creepage pathway 271. The elongated creepage pathway 271 may be provided by coating at least the portion of the ends 221, 222 of the conductive pins 220 that abut the insulated portion 224. The elongated creepage pathway 271 may be provided by coating at least the portion of the header 217 that abuts the insulated portion 224. As shown in FIG. 1C, the elongated creepage pathway 271 may be provided by coating at least the portion of the ends 221, 222 of the conductive pins 220 that abut the insulated portion 224 and at least the portion of the header 217 that abuts the insulated portion 224. Furthermore, as shown in FIG. 1C, providing the elongated pathway 271 may, if desired, involve coating the insulating material 280 located between the pin 220 and the header.

Those of ordinary skill in the art will appreciate that the further away from the insulated portion 224 the ceramic based coating 260 extends along the first and second ends 221, 222 and/or the header 217, the longer the elongated creepage pathway 271 will be. By way of example, an even longer elongated creepage pathway may be provided by coating more of the header 217, including the entirety of the header 217, than is shown in the embodiment depicted in FIG. 1C. By way of yet another example, an even longer elongated creepage pathway may be provided by coating the portion of the first and second ends 221, 222 located between the insulated portion 224 and the connection joints 215, 215', by coating the portion of the first and second ends 221, 222 located between the insulated portion 224 and the connection joints 215, 215' and by coating the connection joints 215, 215', by coating the portion of the first and second ends 221, 222 located between the insulated portion 224 and the connection joints 215, 215' and by coating the connection joints 215, 215' and at least a portion of the exposed portions 122, 122' that extends from the connection joints 215, 215'. By way of still another example, as shown in FIG. 1E, creepage breakdown may be prevented by coating the entirety of the exposed connecting portions 122, 122' of the conductive elements 121, 121', the connecting joints 215, 215', and the portion of the first and second ends 221, 221 of the conductive pins 220 located between the connecting joints 215, 215' and the insulated portion 224.

Those of ordinary skill in the art will appreciate that it is within the scope of the present invention to use the aforementioned or equivalent techniques on only one side 221 or 222 of the pins 220 and/or one side 217*a* or 217*b* of the header 217. In certain situations shorts may be generated by creepage breakdown occurring on only one side 221 or 222 of the pins 220 and/or one side 217*a* or 217*b* of the header 217. By way of example, and not limitation, in situations where the housing 200 contains a vacuum environment that is free of moisture, shorts may be less likely to arise on the first side of the header 217*a* and the first sides 221 of the pins 220 due to the dry vacuum environment. For example, and not limitation, in such a situation the aforementioned techniques may be used on the second side 217*b* of the header 217 and/or the second sides 222 of the pins 222. Alternatively, where one side 217*a*, 217*b* of the header 217 is adequately vented, the aforementioned or equivalent techniques may be used on the side, 217*a*, 217*b* that is inadequately vented.

Those of ordinary skill in the art will appreciate that it is within the scope of the present invention to utilize the aforementioned and equivalent techniques to connect any type of electrical device. By way of example, and not limitation, it is within the scope of the present invention to utilize the aforementioned and equivalent techniques in conjunction with two or more electrical devices, for example, flow transmitters, density transmitters, pressure transmitters, temperature transmitters, densitometers, Coriolis flowmeters, magnetic flowmeters, vortex flowmeters, and ultrasonic flowmeters, or any other electrical devices.

Turning now to FIGS. 2-6, a vibrating flow device 5 in the form of a Coriolis flow meter comprising a sensor assembly 10 and one or more electronics 20 is depicted. Using well known techniques, the one or more electronics 20 measure a characteristic of a flowing substance, such as, for example, density, mass flow rate, volume flow rate, totalized mass flow, temperature, and other information. As hereinafter discussed, during operation of the vibrating flow device, electrical signals are passed between the sensor assembly 10 and the one or more electronics 20.

The vibrating flow device 5 of the present embodiment includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits extend outwardly from the manifolds in an essentially parallel fashion. When sensor assembly 10 is inserted into a pipeline system (not shown) which carries the flowing substance, the substance enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through flange 101'.

The vibrating flow device 5 of the present example includes an electrical device in the form of a drive 104. The drive 104 is affixed to conduits 103A, 103B in a position where the drive 104 can vibrate the conduits 103A, 103B in the drive mode. In the present embodiment, the drive mode is the first out of phase bending mode and the conduits 103A and 103B are preferably selected and appropriately mounted to inlet manifold 102 and outlet manifold 102' so as to have substantially the same mass distribution, moments of inertia, and elastic modules about bending axes X-X and X'-X' respectively. In the present example, where the drive mode is the first out of phase bending mode, the conduits 103A and 103B are driven by drive 104 in opposite directions about their respective bending axes X and X'. Drive 104 may comprise one of many well known arrangements, such as a magnet mounted to conduit 103A and an opposing coil mounted to conduit 103B. Alternatively the drive 104 may comprise a different arrangement, such as, for example, one or more piezoelectric devices. A drive signal in the form of an alternating current is provided by one or more electronics 20, such as for example via pathway 110, and passed through the opposing coil to cause both conduits 103A, 103B to oscillate.

The vibrating flow device 5 of the present embodiment includes electrical devices in the form of a pair of pick-offs 105, 105' that are affixed to conduits 103, 103B. In the embodiment depicted, the pick-offs 105, 105' are located at opposing ends of the conduits 103A, 103B. The pick-offs 105, 105' detect motion of the conduits 103A, 103B and provide pick-off signals to one or more electronics 20 that represent the motion of the conduits 103A, 103B. For example, the pick-offs 105, 105' may supply pick-off signals to the one or more electronics via pathways 111, 111'.

The present embodiment includes an electrical device in the form of one or more electronics 20 that receive the pick-off signals from the pick-offs 105, 105' and provide a drive signal to the drive 104. Path 26 provides an input and an output means that allows one or more electronics 20 to interface with an operator. An explanation of the circuitry of one or more electronics 20 is unneeded to understand the present invention and is omitted for brevity of this description.

Those of ordinary skill in the art will appreciate that the description of FIG. 1 is provided merely as an example of the operation of one possible vibrating flow device 5 and is not intended to limit the teaching of the present invention. Those of ordinary skill in the art will appreciate that it is within the scope of the present invention to use the principals discussed herein in conjunction with any type of vibrating flow device, including, for example, densitometers, regardless of the number of conduits, the number of drives, the number of pick-offs, the operating mode of vibration or the determined characteristic of the flowing substance. Furthermore, those of ordinary skill in the art will appreciate that it is within the scope of the present invention to provide a vibrating flow device that includes one or more resistance temperature devices ("RTDs"). Moreover, although the conduits 103A, 103B are shown provided with a generally U-shape, it is within the scope of the present invention to provide the conduits 103A, 103B with other shapes, such as, for example, straight or irregular shapes. Additionally, although in the present example, the drive mode is described as being the bending mode, it is within the scope of the present invention to utilize other drive modes.

Figure 3:
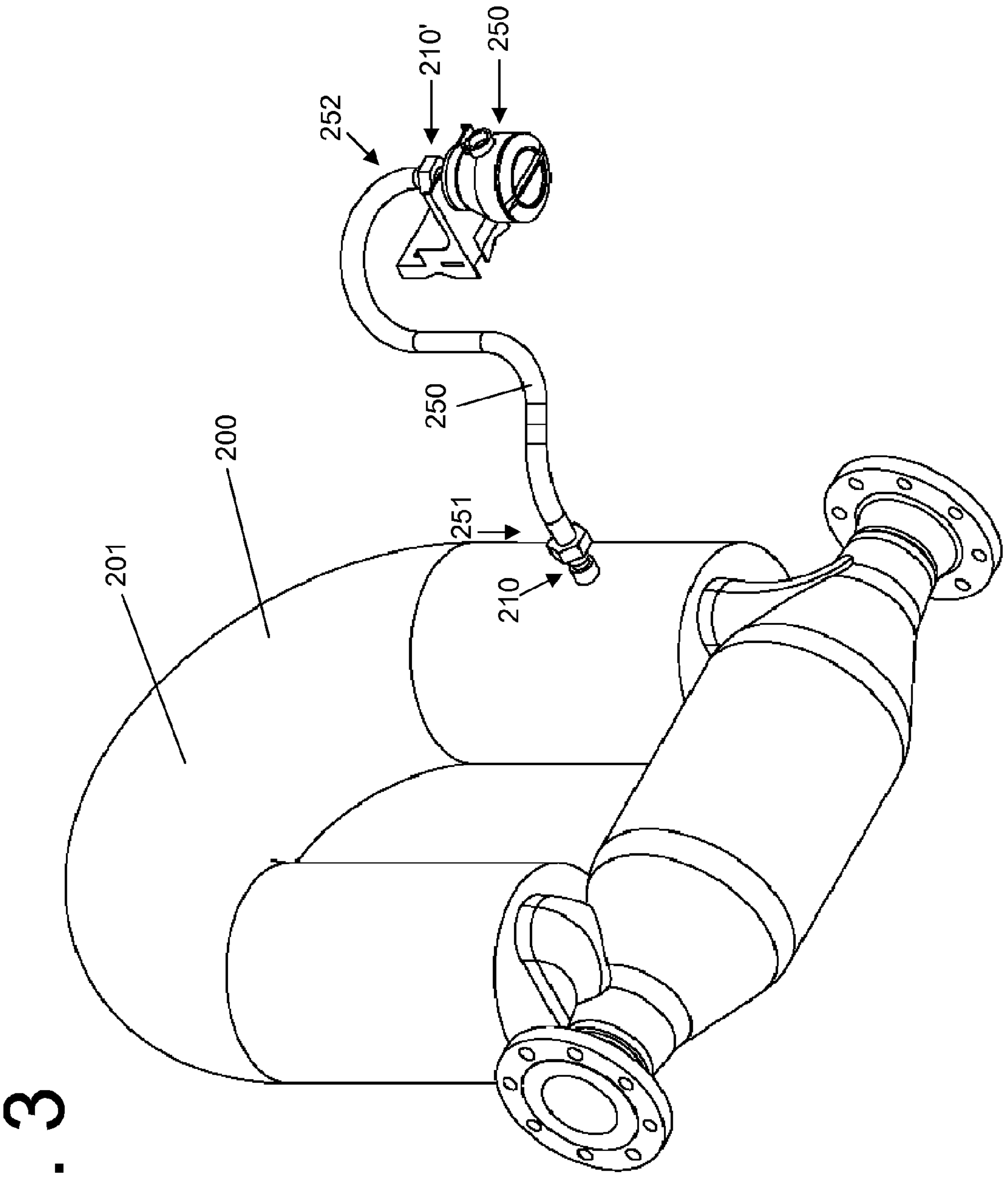
FIG. 3 depicts a perspective view of a housing, feedthru, conduit, and junction box for a vibrating flow device according to one embodiment of the present invention.

FIG. 3 illustrates a housing 200 according to an embodiment of the present invention. According to one aspect of the present embodiment, the housing 200 receives the conduits 103A, 103B. According to another aspect of the present embodiment, the housing 200 receives the drive 104. According to a further aspect of the present embodiment, the housing 200 receives the pick-offs 105-105'.

In the present embodiment shown, a cavity (not shown) is defined by a wall 201 of the housing 200. In the present embodiment shown, the cavity (not shown) receives the conduits 103A, 103B, the drive 104, and the pick-offs 105-105'. Advantageously, the housing 200 may isolate the environment inside the housing 200 from the environment outside the housing 200. For example, in this manner the environment inside the housing 200 may be controlled in a number of ways, such as, for example, by providing a vacuum, inserting a particular gas, or controlling the humidity. Although the housing 200 is shown with a generally "U-shape", it is within the scope of the present invention to provide the housing with other configurations, such as, for example, a tubular, triangular, or irregular shape.

Those skilled in the art will appreciate that the wall 201 of the housing 200 defines one or more openings (not shown) for purposes of connecting the pick-offs 105-105' and the drive 104 to the one or more electronics 20. As shown in FIG. 3, the housing 200 includes at least one feedthru 210 that fits through an opening (not shown) of the housing 200. The feedthru 210 may be integral to the housing 200 or connected in any suitable manner, such as fastening, gluing, soldering, brazing or welding.

Figure 4:
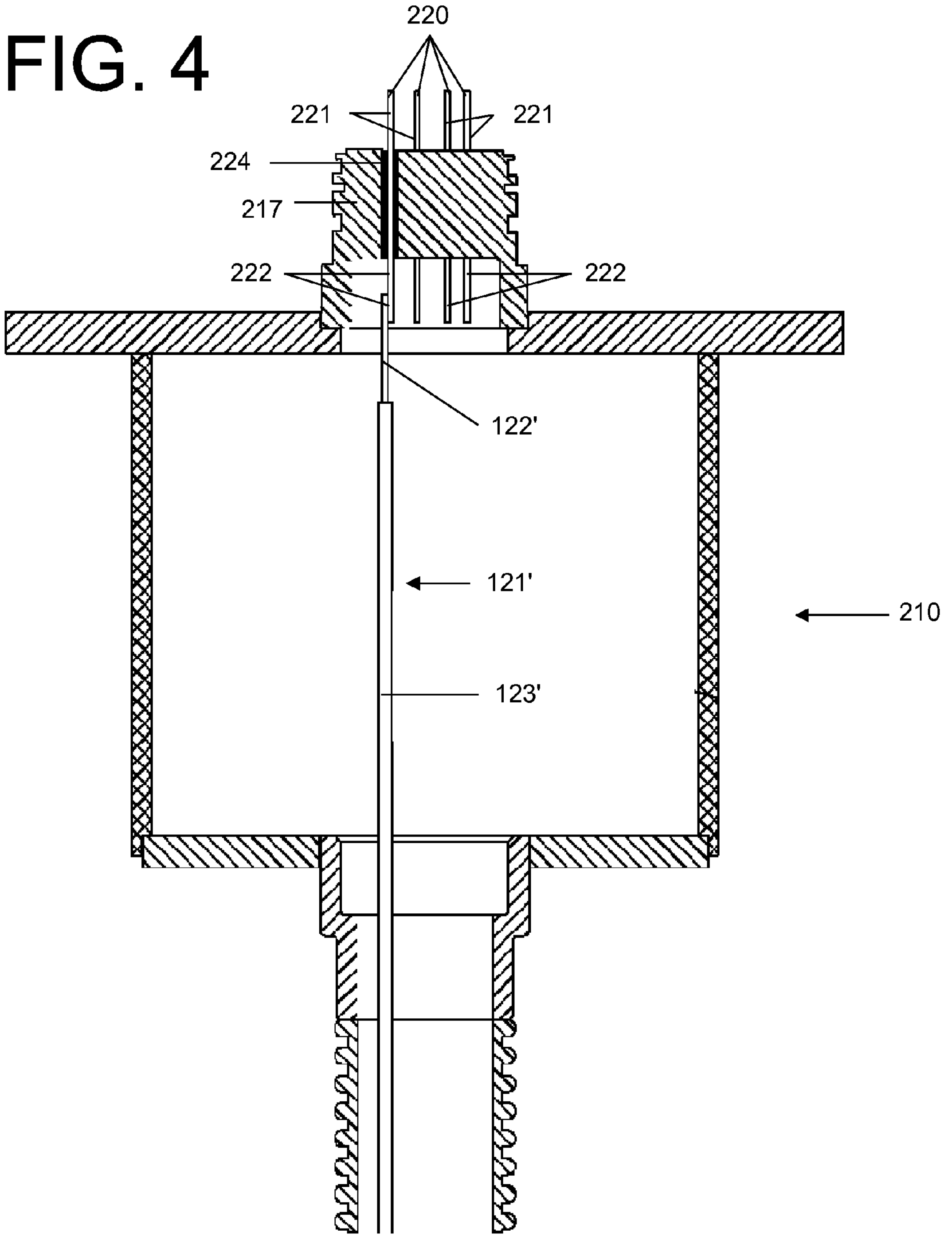
FIG. 4 depicts a sectional view of a feedthru and conduit according to one embodiment of the present invention.
Figure 5:
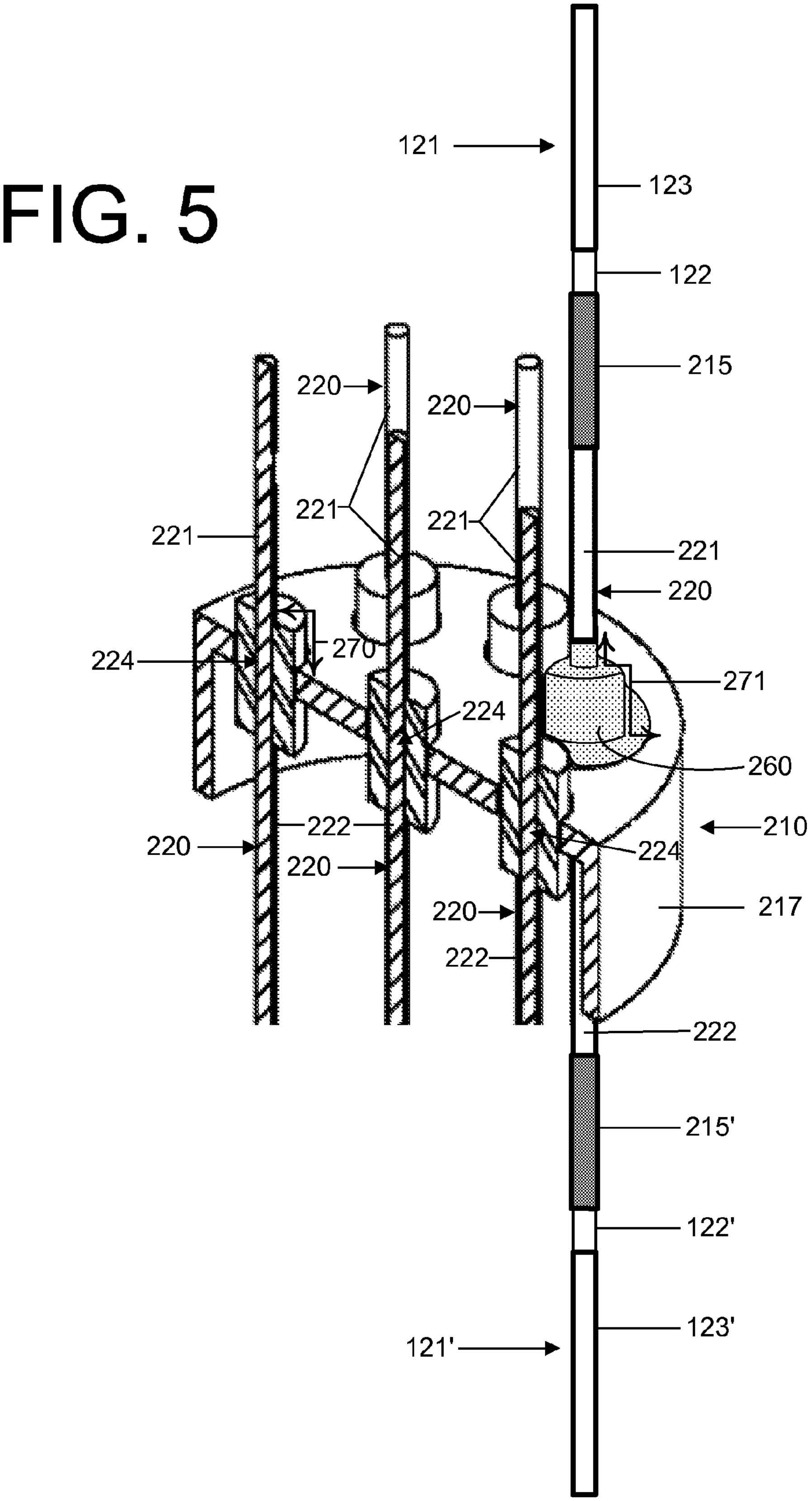
FIG. 5 depicts a sectional view of a feedthru according to one embodiment of the present invention.
Figure 6:
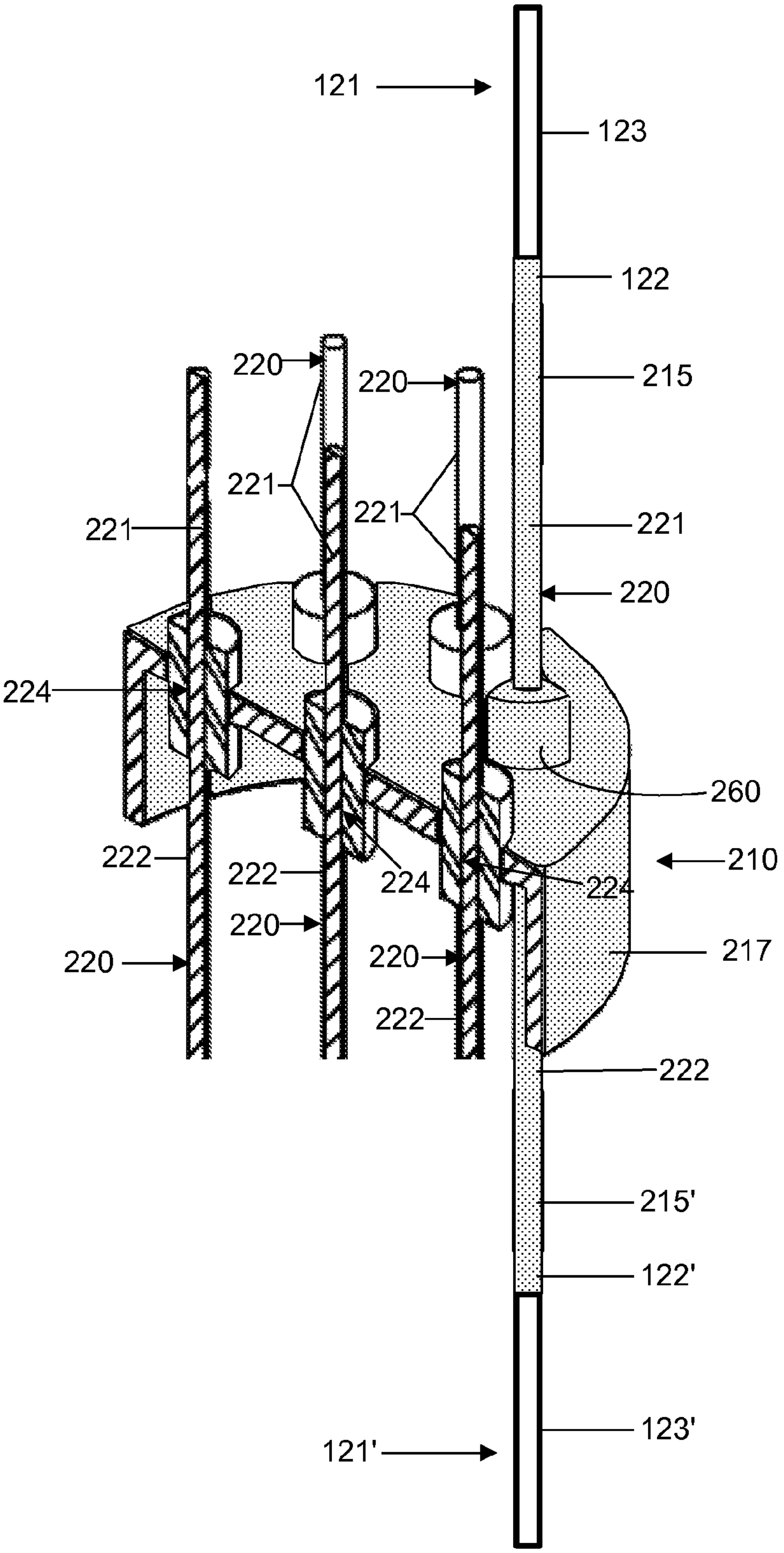
FIG. 6 depicts a sectional view of a feedthru according to one embodiment of the present invention.

According to one aspect of the present embodiment, the feedthru 210 is configured to connect the one or more electronics 20 with the pick-offs 105, 105' and the drive 104. According to another aspect of the present embodiment, as shown in FIGS. 4-6, the feedthru 210 is configured to connect conductive elements 121', which are connected, whether directly or directly, to the one or more electronics 20, to conductive elements 121, which are connected, whether directly or indirectly, to the drive 104 or the pickoffs 105, 105'. Those of ordinary skill in the art will appreciate that in alternative embodiments, the feedthru 210 may further connect one or more RTDs to the one or more electronics in a similar manner.

As shown in FIG. 3, the feedthru 210 is further connected with a conduit 250 which receives the conductive elements 121' connected with the one or more electronics 20. As shown in FIG. 3, the conduit 250 is provided with a first end 251 that connects to the feedthru 210. Also shown, the conduit 250 includes a second end 252. The second end 252 may connect to a variety of structures, including, for example, a second feedthru 210', a junction box 250, or the one or more electronics 20. In the embodiment shown, wherein the second end 252 connects to a second feedthru 210', the second feedthru 210' may connect the conductive elements 121' to additional conductive elements (not shown) in a similar manner as feedthru 210 connects conductive elements 121 to conductive elements 121', as hereinafter discussed.

Turning now to FIGS. 4-6, the feedthru 210 is shown in relation to a conductive element 121 and a conductive element 121'. As shown in FIGS. 5 and 6, the feed thru 210 include a plurality of conductive pins 220 that are provided with an insulated portion 224, such as, for example, a portion including an outer surface of glass, ceramic, plastic or rubber, and a header 217. The conductive pins 220 are provided with a first end 221 that connects to a conductive element 121 and a second end 222 that connects to a conductive element 121'. In this manner the conductive elements 121, 121' are connected, such as, for example, and not limitation, by brazing, soldering, or otherwise joining. As shown in FIGS. 5 and 6, the conductive elements 121, 121' may be connected with the conductive pins 220 via connection joints, as at 215, 215'.

Those of ordinary skill in the art will appreciate that in order to connect the conductive pins 220 to the conductive elements 121, 121', at least a portion of the conductive pins 220 and the conductive elements 121, 121' must be exposed. As shown in FIG. 4, the first and second ends 221, 222 of the conductive pins 220 are exposed and spaced by the insulated portion 224. Similarly, as shown in FIGS. 4 and 5, the conductive elements 121, 121' are provided with exposed connecting portions 122, 122' and, preferably, insulated portions 123, 123'. In this manner, the exposed connecting portions 122, 122' of the conductive elements 121, 121' may connect to the first and second ends 221, 222 of the conductive pins 220 to provide an electrically conducting pathway that allows the one or more electronics 20 to send a drive signal to the drive 104 and receive pick-off signals from the pick-offs 105, 105'.

As shown in FIGS. 4-6, the insulated portions 224 of the conductive pins 220 extend through the header 217 of the feed through 210. In embodiments wherein the header 217 is metal, it is possible that moisture or some other substance on the insulated portion 224 could provide a conductive pathway between the header 217 and the pins 220. Such a pathway could ground the signals between the one or more electronics 20 and the drive 104 and the pick-offs 105, 105'. Since at least a portion of the conductive pins 220 and conductive elements 121, 121' must be exposed in order to connect the conductive pins 220 to the conductive elements 121, 121', where moisture condenses on the insulated portion 224 or any other conductive substance is located on the insulated portion 224, a low resistance pathway 270 may be provided that allows an electrical current to be transferred from the exposed first or second ends 221, 221 of the conductive pins 220 to the header 217. Those of ordinary skill in the art will appreciate that a low resistance pathway, such as 270, may generate a short.

Accordingly, as shown in FIG. 5, at least a portion of the exposed ends 221, 222 of the conductive pins 220 and/or the header 217 are coated with the ceramic based coating 260. The elongated creepage pathway 271 may be provided by coating at least the portion of the ends 221, 222 of the conductive pins 220 that abut the insulated portion 224. As shown in FIG. 5, the elongated creepage pathway 271 may be provided by coating at least the portion of the header 217 that abuts the insulated portion 224. As shown in FIG. 5, the elongated creepage pathway 271 may be provided by coating at least the portion of the ends 221, 222 of the conductive pins 220 that abut the insulated portion 224 and at least the portion of the header 217 that abuts the insulated portion 224. Furthermore, as shown in FIG. 5, providing the elongated pathway 271 may, if desired, involve coating the outer surface of the insulated portion 224.

Those of ordinary skill in the art will appreciate that the further away from the insulated portion 224 the ceramic based coating 260 extends along the first and second ends 221, 222 and/or the header 217, the longer the elongated creepage pathway 271 will be. By way of example, as shown in FIG. 6, an even longer elongated creepage pathway may be provided by coating more of the header 217, including the entirety of the header 217, than is shown in the embodiment depicted in FIG. 5. By way of yet another example, as shown in FIG. 6, an even longer elongated creepage pathway may be provided by coating the portion of the first and second ends 221, 222 located between the insulated portion 224 and the connection joints 215, 215', by coating the portion of the first and second ends 221, 222 located between the insulated portion 224 and the connection joints 215, 215' and by coating the connection joints 215, 215', by coating the portion of the first and second ends 221, 222 located between the insulated portion 224 and the connection joints 215, 215' and by coating the connection joints 215, 215' and at least a portion of the exposed portions 122, 122' that extends from the connection joints 215, 215'. By way of still another example, as shown in FIG. 6, creepage breakdown may be eliminated by coating the entirety of the exposed connecting portions 122, 122' of the conductive elements 121, 121', the connecting joints 215, 215', and the portion of the first and second ends 221, 221 of the conductive pins 220 located between the connecting joints 215, 215' and the insulated portion 224.

Those of ordinary skill in the art will appreciate that it is within the scope of the present invention to use the aforementioned and equivalent techniques on only one side 221 or 222 of the pins 220 and/or one side 217*a* or 217*b* of the header 217. In certain situations shorts may be generated by creepage breakdown occurring on only one side 221 or 222 of the pins 220 and/or one side 217*a* or 217*b* of the header 217. By way of example, and not limitation, in situations where the housing 200 contains a vacuum environment that is free of moisture, shorts may be less likely to arise on the first side of the header 217*a* and the first sides 221 of the pins 220 due to the dry vacuum environment. For example, and not limitation, in such a situation the aforementioned techniques may be used on the second side 217*b* of the header 217 and/or the second sides 222 of the pins 222. Alternatively, where one side 217*a*, 217*b* of the header 217 is adequately vented, the aforementioned or equivalent techniques may be used on the side, 217*a*, 217*b* that is inadequately vented.

Furthermore, those of ordinary skill in the art will appreciate that in alternative embodiments, the header 217 may be fabricated from a material having a high electrical resistance relative to a metal material, for example, and not limitation, a plastic, rubber, or a glass, such as, for example, a fiberglass. In such embodiments, the header 217 may function as an insulator. Those of ordinary skill in the art will appreciate that in such embodiments, rather than the insulating portions 224 being portions of the conductive pins 224 including an outer surface of glass, ceramic, or rubber, the portion of the conductive pins 220 extending through the header 217 may be the insulated portion 224. Since, however, in such embodiments, creepage breakdown may occur between the various pins 220, the aforementioned and equivalent techniques may be used to increase the creepage distance between any exposed conductive surface, i.e. first and second sides 221, 222, connection joints 215, 215' and/or connecting portions 122, 122'.

Additionally, the aforementioned and equivalent techniques may, within the scope of the present invention, if desired, be used in conjunction with a high temperature silver braze in the connection joints 215, 215' and in conjunction with cleaning in order to remove contaminants, such as, for example, flux, from any insulating material, conductive pins 220, connection joints 215, 215', and conductive elements 121, 121'.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. At least one feedthru (210, 210'), comprising:

at least one conductive pin (220) that extends through a header (217) wherein:

the at least one conductive pin (220) includes an exposed first end (221) and an exposed second end (222) spaced by an insulated portion (224);

the at least one conductive pin (220) connects a first conductive element (121) connected with a first electrical device (300, 300*a*, 300*b*, 104, 105, 105') and a second conductive element (121') connected with another electrical device (20, 301), whereby the exposed first end (221) connects to the first conductive element (121) and the exposed second end (221) connects to the second conductive element (121');

a ceramic based conformational film coating (260) located on at least one of the following:

at least a portion of the second end (222) of the at least one conductive pin (220) that abuts the insulated portion (224) of the pin (220) and at least a portion of the second side (217*b*) of the header (217) that abuts the insulated portion (224) of the pin (220), wherein the second end (222) of the at least one conductive pin (220) extends from the second side (217*b*) of the header (217); and at least a portion of the first end (221) of the at least one conductive pin (220) that abuts the insulated portion (224) of the pin (220) and at least a portion of a first side (217*a*) of the header (217) that abuts the insulated portion (224) of the pin (220), wherein the first end (221) of the at least one conductive pin (220) extends from the first side (217*a*) of the header (217).

2. The at least one feedthru (210, 210') according to claim 1, wherein the ceramic based coating (260) is located on at least the portion of the first end (221) of the at least one conductive pin (220) that abuts the insulated portion (224) of the pin (220), at least the portion of a first side (217*a*) of the header (217) that abuts the insulated portion (224) of the pin (220), at least the portion of the second end (222) of the at least one conductive pin (220) that abuts the insulated portion (224) of the pin (220), and at least the portion of the second side (217*b*) of the header (217) that abuts the insulated portion (224) of the pin (220), wherein the first end (221) of the at least one conductive pin (220) extends from the first side 217(a) of the header (217) and the second end (222) of the at least one conductive pin (220) extends from the second side (217*b*) of the header (217).

3. The at least one feedthru (210, 210') according to claim 1, wherein the exposed first end (221) of the at least one conductive pin (220) is connected with the first conductive element (121) via a first connection joint (215) and the exposed second end (222) of the at least one conductive pin (220) is connected with the second conductive element (121') via a second connection joint (215) and the ceramic based coating (260) is located on at least one of the first and second connection joints (215, 215').

4. The at least one feedthru (210, 210') according to claim 1, wherein the first conductive element (121) includes a first exposed portion (122) and a first insulated portion (123) and the second conductive element (121') includes a second exposed portion (121') and a second insulated portion (123') and the ceramic based coating (260) is located on at least one of the first and second exposed portions (122, 122').

5. The at least one feedthru (210, 210') according to claim 1, wherein:

the first conductive element (121) includes a first exposed portion (122) and a first insulated portion (123);

the second conductive element (121') includes a second exposed portion (121') and a second insulated portion (123');

the exposed first end (221) of the at least one conductive pin (220) is connected with the first exposed portion (122) of the first conductive element (121) via a first connection joint (215);

the exposed second end (222) of the at least one conductive pin (220) is connected with the second exposed portion (122') of the second conductive element (121') via a second connection joint (215);

the ceramic based coating (260) extends from at least one or both of the following:

the first end (221) of the at least one conductive pin (220) that abuts the insulated portion (224) of the pin (220) to the first insulating portion (123) of the first conductive element (121); and the second end (222) of the at least one conductive pin (220) that abuts the insulated portion (224) of the pin (220) to the second insulating portion (123) of the second conductive element (121').

6. The at least one feed thru (210, 210') according to claim 1, wherein the feedthru (210, 210') includes a plurality of pins (220) that extend through the header (217) and connect the first electrical device (300, 300*a*, 300*b*, 104, 105, 105') with the another electrical device (20, 301) and the ceramic based coating (260) is located on at least one of the following:

at least the portion of the first end (221) of each conductive pin (220) that abuts the insulated portion (224) of each of the conductive pin (220);

at least the portion of the second end (222) of each conductive pin (220) that abuts the insulated portion (224) of each conductive pin (220);

at least the portion of a first side (217*a*) of the header (217) that abuts the insulated portion (224) of each conductive pin (220); and at least the portion of a second side (217*b*) of the header (217) that abuts the insulated portion (224) of each conductive pin (220).

7. The at least one feed thru (210, 210') according to claim 1, wherein the feedthru (210, 210') includes a plurality of pins (220) that extend through the header (217) and connect a first electrical device (300, 300*a*, 300*b*, 104, 105, 105') and a second electrical device (300, 300*a*, 300*b*, 104, 105, 105') with the another electrical device (20, 301) and the ceramic based coating (260) is located on at least one of the following:

at least the portion of the first end (221) of each conductive pin (220) that abuts the insulated portion (224) of each of the conductive pin (220);

at least the portion of the second end (222) of each conductive pin (220) that abuts the insulated portion (224) of each conductive pin (220);

at least the portion of a first side (217*a*) of the header (217) that abuts the insulated portion (224) of each conductive pin (220); and at least the portion of a second side (217*b*) of the header (217) that abuts the insulated portion (224) of each conductive pin (220).

8. The at least one feed thru (210, 210') according to claim 1, wherein the first electrical device includes a drive (104) of a vibrating flow device (5) and the another electrical device includes one or more electronics (20) of the vibrating flow device (5).

9. The at least one feed thru (210, 210') according to claim 1, wherein the first electrical device includes a pick-off (105, 105') of a vibrating flow device (5) and the another electrical device includes one or more electronics (20) of the vibrating flow device (5).

10. A method for connecting a first electrical device (300, 300*a*, 300*b*, 104, 105, 105') to another electrical device (20, 301), comprising the steps of:

providing a feedthru (210, 210') that includes at least one conductive pin (220) that extends through a header (217), wherein the at least one conductive pin (220) includes an exposed first end (221) and an exposed second end (222) spaced by an insulated portion (224);

connecting the exposed first end (221) to a first conductive element (212) connected with the first electrical device (300, 300*a*, 300*b*, 104, 105, 105');

connecting the exposed second end (222) to a second conductive element (212') connected with the another electrical device (20, 301);

applying a ceramic based conformational film coating (260) so that it is located on at least one of the following:

at least a portion of the second end (222) of the one conductive pin (220) that abuts the insulated portion (224) of the pin (220) and at least a portion of a second side (217*b*) of the header (217) that abuts the insulated portion (224) of the pin (220), wherein the second end (222) of the at least one conductive pin (220) extends from the second side (217*b*) of the header (217); and at least a portion of the first end (221) of the one conductive pin (220) that abuts an insulated portion (224) of the pin (220) and at least a portion of a first side (217*a*) of the header (217) that abuts the insulated portion (224) of the pin (220), wherein the first end (221) of the at least one conductive pin (220) extends from the first side (217*a*) of the header (217).

11. The method for connecting the first electrical device (300, 300*a*, 300*b*, 104, 105, 105') to the another electrical device (20, 301) according to claim 10, wherein the ceramic based coating is applied on at least the portion of the first end (221) of the at least one conductive pin (220) that abuts the insulated portion (224) of the pin (220), at least the portion of a first side (217*a*) of the header (217) that abuts the insulated portion (224) of the pin (220), at least the portion of the second end (222) of the at least one conductive pin (220) that abuts the insulated portion (224) of the pin (220), and at least the portion of the second side (217*b*) of the header (217) that abuts the insulated portion (224) of the pin (220), wherein the first end (221) of the at least one conductive pin (220) extends from the first side 217(a) of the header (217) and the second end (222) of the at least one conductive pin (220) extends from the second side (217*b*) of the header (217).

12. The method for connecting the first electrical device (300, 300*a*, 300*b*, 104, 105, 105') to the another electrical device (20, 301) according to claim 10, further comprising the steps of:

soldering or brazing the exposed first end (221) to the first conductive element (121) to provide a first connection joint (215);

soldering or brazing the exposed second end (222) to the second conductive element (121') to provide a second connection joint (215'); and applying the ceramic based coating (260) on to at least one of the first and second connection joints (215, 215').

13. The method for connecting the first electrical device (300, 300*a*, 300*b*, 104, 105, 105') to the another electrical device (20, 301) according to claim 10, wherein the first conductive element (121) includes a first exposed portion (122) and a first insulated portion (123) and the second conductive element (121') includes a second exposed portion (121') and a second insulated portion (123') and further comprising the step of applying the ceramic based coating (260) onto at least one of the first and second exposed portions (122, 122').

14. The method for connecting the first electrical device (300, 300*a*, 300*b*, 104, 105, 105') to the another electrical device (20, 301) according to claim 10, wherein:

the first conductive element (121) includes a first exposed portion (122) and a first insulated portion (123);

the second conductive element (121') includes a second exposed portion (121') and a second insulated portion (123');

the exposed first end (221) of the at least one conductive pin (220) is connected with the first exposed portion (122) of the first conductive element (121) via a first connection joint (215);

the exposed second end (222) of the at least one conductive pin (220) is connected with the second exposed portion (122') of the second conductive element (121') via a second connection joint (215);

further comprising the step of applying the ceramic based coating (260) so that it extends from at least one or both of the following:

the first end (221) of the at least one conductive pin (220) that abuts the insulated portion (224) of the pin (220) to the first insulating portion (123) of the first conductive element (121); and the second end (222) of the at least one conductive pin (220) that abuts the insulated portion (224) of the pin (220) to the second insulating portion (123) of the second conductive element (121').

15. The method for connecting the first electrical device (300, 300*a*, 300*b*, 104, 105, 105') to the another electrical device (20, 301) according to claim 10, wherein the feedthru (210, 210') includes a plurality of pins (220) that extend through the header (217) and connect the first electrical device (300, 300*a*, 300*b*, 104, 105, 105') with the another electrical device (20, 301) and further comprising the step of applying the ceramic based coating (260) so that it is located on at least one of the following:

at least the portion of the first end (221) of each conductive pin (220) that abuts the insulated portion (224) of each of the conductive pin (220);

at least the portion of the second end (222) of each conductive pin (220) that abuts the insulated portion (224) of each conductive pin (220);

at least the portion of a first side (217*a*) of the header (217) that abuts the insulated portion (224) of each conductive pin (220); and at least the portion of a second side (217*b*) of the header (217) that abuts the insulated portion (224) of each conductive pin (220).

16. The method for connecting the first electrical device (300, 300*a*, 300*b*, 104, 105, 105') to the another electrical device (20, 301) according to claim 10, wherein the feedthru (210, 210') includes a plurality of pins (220) that extend through the header (217) and connect a first electrical device (300, 300*a*, 300*b*, 104, 105, 105') and a second electrical device (300, 300*a*, 300*b*, 104, 105, 105') with the another electrical device (20, 301) and further comprising the step of applying the ceramic based coating (260) so that it is located on at least one of the following:

at least the portion of the first end (221) of each conductive pin (220) that abuts the insulated portion (224) of each of the conductive pin (220);

at least the portion of the second end (222) of each conductive pin (220) that abuts the insulated portion (224) of each conductive pin (220);

at least the portion of a first side (217*a*) of the header (217) that abuts the insulated portion (224) of each conductive pin (220); and at least the portion of a second side (217*b*) of the header (217) that abuts the insulated portion (224) of each conductive pin (220).

17. The at least one feed thru (210, 210') according to claim 1, wherein the first electrical device includes a drive (104) of a vibrating flow device (5) and the another electrical device includes one or more electronics (20) of the vibrating flow device (5).

18. The at least one feed thru (210, 210') according to claim 1, wherein the first electrical device includes a pick-off (105, 105') of a vibrating flow device (5) and the another electrical device includes one or more electronics (20) of the vibrating flow device (5).

19. A feedthru (210, 210') , comprising:

a metal header (217) configured to be welded to a housing (200) of a first electrical device (300) and is further configured to be removably affixed to a second electrical device (301);

at least one conductive pin (220) extending through the metal header (217), wherein the at least one conductive pin (220) includes an exposed first end (221) and an exposed second end (222) spaced by an insulated portion (224);

a glass insulating material (280) formed in the metal header (217), with the glass insulating material (280) forming the insulated portion (224) that electrically isolates the at least one conductive pin (220) from the metal header (217);

a ceramic based conformational film coating (260) located on at least one of the following:

at least a portion of the second end (222) of the at least one conductive pin (220) that abuts the insulated portion (224) of the pin (220) and at least a portion of a second side (217*b*) of the header (217) that abuts the insulated portion (224) of the pin (220), wherein the second end (222) of the at least one conductive pin (220) extends from the second side (217*b*) of the header (217); and at least a portion of the first end (221) of the at least one conductive pin (220) that abuts the insulated portion (224) of the pin (220) and at least a portion of a first side (217*a*) of the header (217) that abuts the insulated portion (224) of the pin (220), wherein the first end (221) of the at least one conductive pin (220) extends from the first side (217*a*) of the header (217).

* * * * *